US011570175B2

(12) United States Patent
Balmakhtar et al.

(10) Patent No.: US 11,570,175 B2
(45) Date of Patent: Jan. 31, 2023

(54) COMMUNICATION NETWORK EDGE COMPUTING AUTHORIZATION

(71) Applicant: T-MOBILE INNOVATIONS LLC, Overland Park, KS (US)

(72) Inventors: Marouane Balmakhtar, Fairfax, VA (US); Lyle W. Paczkowski, Mission Hills, KS (US)

(73) Assignee: T-Mobile Innovations LLC, Overland, KS (US)

( * ) Notice: Subject to any disclaimer, the term of this patent is extended or adjusted under 35 U.S.C. 154(b) by 312 days.

(21) Appl. No.: 17/063,446

(22) Filed: Oct. 5, 2020

(65) Prior Publication Data
US 2022/0109676 A1 Apr. 7, 2022

(51) Int. Cl.
*H04L 9/40* (2022.01)
*A63F 13/35* (2014.01)
(Continued)

(52) U.S. Cl.
CPC .............. *H04L 63/10* (2013.01); *A63F 13/35* (2014.09); *A63F 13/792* (2014.09);
(Continued)

(58) Field of Classification Search
CPC ... H04L 9/0637; H04L 9/0643; H04L 9/3247; H04L 2209/38; G06F 16/27;
(Continued)

(56) References Cited

U.S. PATENT DOCUMENTS 10,299,128 B1 5/2019 Suthar et al.
10,491,376 B1 11/2019 Suthar et al.
(Continued)

FOREIGN PATENT DOCUMENTS

WO 20180236421 A1 12/2018

OTHER PUBLICATIONS

Foreign Communication From a Related Counterpart Application, International Search Report and Written Opinion dated Nov. 18, 2021, International Application No. PCT/US2021/044088 filed on Jul. 31, 2021.
(Continued)

*Primary Examiner* — Arvin Eskandarnia

(57) ABSTRACT

A method of authorizing computing services at the edge of a communication network. The method comprises receiving an authorization request from an application server by an authorization application executing on a computer, in response to receiving the authorization request, analyzing by the authorization application a plurality of records of communication transactions completed by the application server to determine compliance with network edge communication terms of use defined for the application server by the communication network, wherein the records are stored in blocks of a blockchain maintained by the authorization application, and, based on determining that the application server is in compliance with the terms of use, sending an authorization message by the authorization application to the application server, wherein the authorization message indicates a deadline for requesting a next authorization from the authorization application, whereby the edge computing is supported securely by the communication network.

20 Claims, 7 Drawing Sheets

(51) Int. Cl.
*A63F 13/792* (2014.01)
*G06F 16/23* (2019.01)
*G06Q 10/06* (2012.01)
*G06Q 10/10* (2012.01)
*G06Q 20/08* (2012.01)
*G06Q 20/12* (2012.01)
*G06Q 30/00* (2012.01)
*H04L 47/70* (2022.01)

(52) U.S. Cl.
CPC ..... *G06F 16/2379* (2019.01); *G06Q 10/0631* (2013.01); *G06Q 10/10* (2013.01); *G06Q 20/085* (2013.01); *G06Q 20/127* (2013.01); *G06Q 30/0185* (2013.01); *H04L 47/82* (2013.01)

(58) Field of Classification Search
CPC ........ G06F 16/2379; G06F 8/65; G06F 9/466; G05B 19/41855; G05B 2219/31151; G05B 2219/25112
See application file for complete search history.

(56) References Cited

U.S. PATENT DOCUMENTS

| | | | |
|---|---|---|---|
| 2017/0279774 A1* | 9/2017 | Booz | G06Q 20/0658 |
| 2018/0094953 A1* | 4/2018 | Colson | G06Q 10/0833 |
| 2019/0080118 A1* | 3/2019 | Brady | G06F 8/65 |
| 2019/0109877 A1* | 4/2019 | Samuel | H04L 63/123 |
| 2019/0227515 A1* | 7/2019 | Fink | G06Q 10/087 |
| 2019/0303623 A1* | 10/2019 | Reddy | G06F 8/71 |
| 2020/0133658 A1* | 4/2020 | Agrawal | H04L 9/50 |
| 2020/0221299 A1 | 7/2020 | Suthar et al. | |
| 2020/0314648 A1 | 10/2020 | Cao | |

OTHER PUBLICATIONS

Balmakhtar, Marouane, et al., "Communication Network Edge Computing Authorization," filed Jul. 31, 2021, International Application No. PCT/US2021/044088.

* cited by examiner

COMMUNICATION NETWORK EDGE COMPUTING AUTHORIZATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Edge computing refers to locating processing resources proximate to users of those processing resources. When a user accesses content it may be that the requested content can be successfully delivered in a broad range of time. If the user browser experiences a 5 second delay before presenting a social networking page, the user may not be dissatisfied. In this case, a user located in San Francisco may not notice a difference in performance between a social networking application server located in Lodi, Calif. and a social network application server located in Springfield, Mass. On the other hand, if the user is playing an interactive video game the content update requirements may be near real-time. In this case, the user laying the interactive video game may well discern a difference between a gaming application server located in Lodi, Calif. fulfilling game client requests versus a gaming application server located in Springfield, Mass. fulfilling the same game client requests. Edge computing can provide reduced latency for applications that desire low delays in service requests. The communication network linking the user device and the edge computing platform desirably is likewise proximate to the user. For example, the communication path is desirably from the user in San Francisco to a communication gateway in San Jose, to the application server in Lodi, back to the communication gateway in San Jose, and from the communication gateway to the user in San Francisco. This would be a preferred communication path rather than from the user in San Francisco to a communication gateway in Lexington, Ky., to the application server in Lodi, back to the communication gateway in Lexington, and from the communication gateway to the user in San Francisco.

SUMMARY

In an embodiment, an edge computing authorization platform is disclosed. The edge computing authorization platform comprises a processor, a non-transitory memory storing at least one blockchain comprising blocks recording authorization events, wherein each authorization event identifies an edge application server that has been authorized to use communication network services and identifies a deadline for requesting a new authorization, and an authorization application stored in the non-transitory memory. When executed by the processor, the authorization application receives a plurality of transaction reports from a plurality of edge application servers, wherein each transaction report comprises information about at least one transaction between the associated edge application server and a user equipment (UE) and information about a path followed by the transaction through the communication network and receives a plurality of authorization requests from the plurality of edge application servers. The authorization application, in response to receiving an authorization request from an edge application server, analyzes at least one transaction report received from the edge application server and at least one block recording authorization events associated with the edge application server stored in the blockchain in the non-transitory memory to determine if the edge application server complies with terms of use defined for the edge application by the communication network. The authorization application, in response to determining that an edge application server complies with terms of use, creating a block recording an authorization event identifying the edge application server that complies with terms of use and a deadline for requesting a new authorization and storing the block in the blockchain in the non-transitory memory, and, in response to determining that an edge application server does not comply with terms of use, takes action by altering communication network service provided to the edge application server that does not comply with terms of use.

In another embodiment, a method of providing computing services at the edge of a communication network by an application server is disclosed. The method comprises requesting authorization to use network edge communication resources from an authorization server in a network core by an edge authorization application executing on the application server, receiving an authorization message by the edge authorization application from the authorization server, wherein the authorization message indicates a deadline for requesting a new authorization to use network edge communication resources, and storing the authorization message in a blockchain by the edge authorization application, wherein the blockchain is maintained on the application server by the edge authorization application. The method further comprises serving user application requests by an edge application executing on the application server, recording information by the edge authorization application in the blockchain maintained on the application server, where the recorded information is about the user application requests served by the edge application and comprises a path of communication between the users and the application server, and selecting some of the blocks from the blockchain by the authorization application. The method further comprises sending the selected blocks by the authorization application to the authorization server, whereby the authorization server is enabled to monitor the activity of the application server; determining that the deadline for requesting a new authorization to use network edge communication resources is close, and, in response to determining that the deadline is close, requesting updated authorization to use network edge communication resources from the authorization server by the authorization application.

In yet another embodiment, a method of authorizing computing services at the edge of a communication network is disclosed. The method comprises receiving an authorization request from an application server by an authorization application executing on a computer, and, in response to receiving the authorization request, analyzing by the authorization application a plurality of records of communication transactions completed by the application server to determine compliance with network edge communication terms of use defined for the application server by the communication network, wherein the records are stored in blocks of a blockchain maintained by the authorization application. The method further comprises, based on determining that the application server is in compliance with the terms of use, sending an authorization message by the authorization application to the application server, wherein the authorization message indicates a deadline for requesting a next authorization from the authorization application, whereby the edge computing is supported securely by the communication network.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
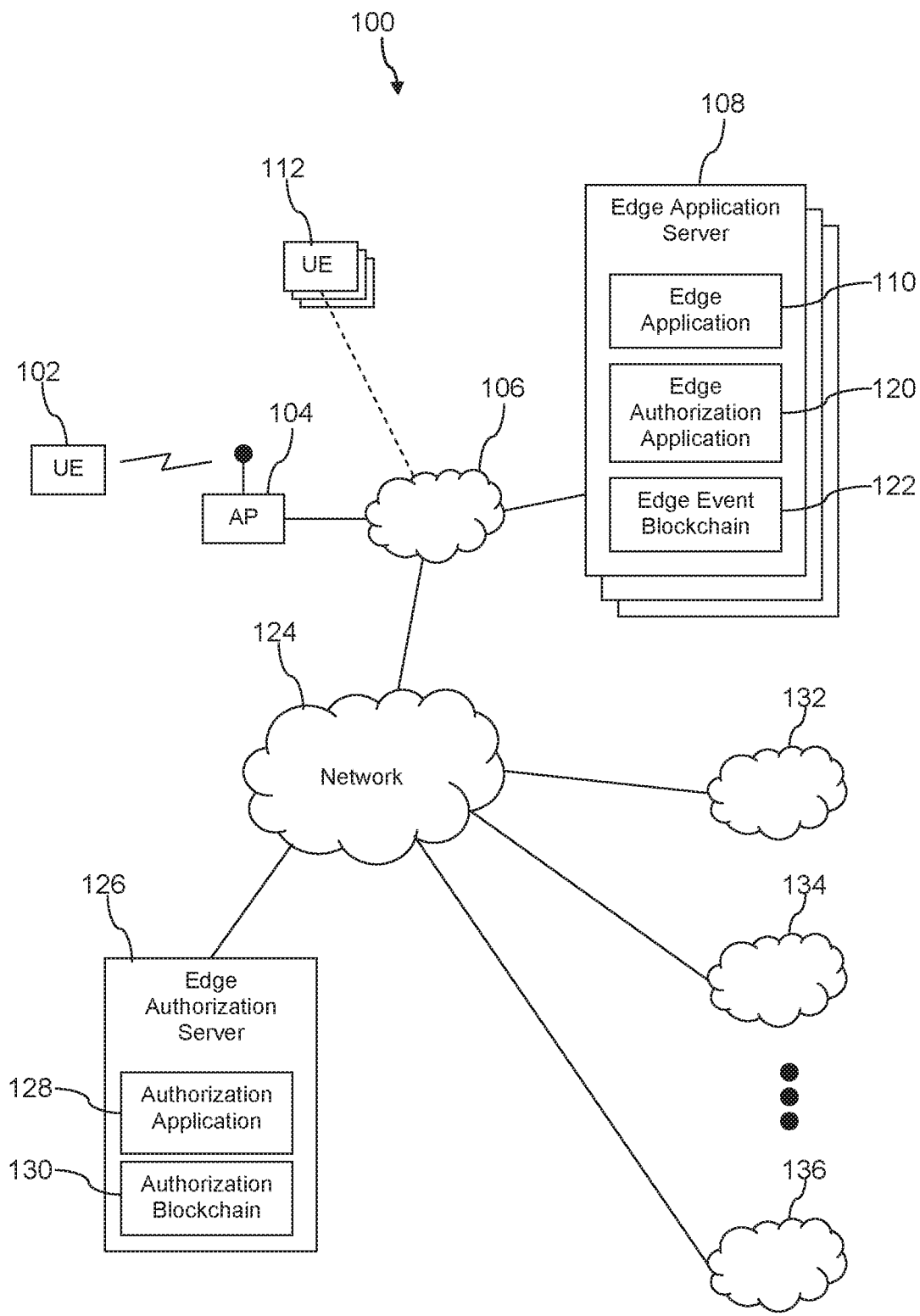
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In 5G communication networks being deployed there is a desire to push some applications to the edge of the network—that is, to position application servers geographically proximate to end users whereby to reduce network long-haul traffic. As an example, rather than having Internet searches originating in Boston being fulfilled by a search application server in San Francisco, a plurality of Internet search application servers would be positioned around the country. For example, an Internet search initiated in Boston may be executed by an Internet search application server positioned in Springfield, Mass. while an Internet search initiated in Des Moines, Iowa may be executed by an Internet search application server positioned in Omaha, Nebr. In some contexts this paradigm may be referred to as "edge computing" and the portion of the communication network that carries the transactions fulfilled with such "edge computing" may be referred to as an "edge network" or as the "network edge."

The question becomes how do communication service providers (e.g., telecommunications companies) secure the network edge? How do communication service providers audit the applications executing on application servers at the network edge? The traditional process of securing transactions carried out by application servers is to authorize each transaction via a centralized authorization service residing in the core of the communication network. But that traditional process defeats the purpose of edge computing—reducing transaction latencies and reducing network traffic. The invention proposes to maintain blockchains at the edge nodes that track transactions and other activities at that edge node, for example at an edge communication gateway or for example at the application server. When events occur at the edge, the events are recorded in new blocks of an edge event blockchain. These events may be transactions (e.g., between the edge application server and user equipments (UEs)), starts of the edge application server, stops of the edge application server, operating system updates of the edge application server, executions of malware search software, and confirmation of authorization renewals or handshakes with a central authorization server or service. In an embodiment, information about the communication path that a transaction takes in the edge network (e.g., the communication path between the UE and the application server) is stored in a newly created block and added to the edge event blockchain. The information in a block describing a transaction may comprise the identity of the UE, the identity of the application server, the identities of network nodes transited by the transaction, and time stamps when the network nodes were transited. The information in a block describing a transaction may identify the characteristics of the transaction, for example a type of transaction and/or a quality of service (QoS) attached to the transaction. The information in a block describing a transaction may identify an aggregate data volume associated with the transaction (e.g., how many bytes associated with the transaction transited the edge network).

The application server engaged in edge computing will periodically update the central authorization server with event information from the blockchain maintained by the application server. This may be referred to as a periodic event update or a periodic application server event update. This information may comprise all of the blocks added to the application server's blockchain since the last periodic update. In an embodiment, the application server may analyze a plurality of blocks to summarize and/or aggregate the information in the plurality of blocks and provide the periodic update in the form of a concise summary extracted from the blockchain it maintains. The central authorization server stores the periodic updates received from the many different application servers engaged in edge computing that it oversees.

In an embodiment, the central authorization server maintains a blockchain that stores information about the periodic updates received from the application servers engaged in edge computing that it oversees. When a periodic update is received, the central authorization server creates a new block, adds the information of the periodic update, and stores this new block on the blockchain. In an embodiment, the central authorization server maintains a single blockchain comprising blocks storing information on periodic updates received from a plurality of different application servers engaged in edge computing. In another embodiment, the central authorization server maintains a different blockchain for each different application server engaged in edge computing and stores blocks received from each application server on the blockchain associated with that specific application server.

The central authorization server grants authorization to application servers engaged in edge computing to communicate with UEs via the network edge without undergoing the onerous traditional process of the application server obtaining authorization from the central authorization server for each transaction with a UE. This avoids the problems described above of increasing latency and increasing network traffic. This authorization is temporary and obliges the application servers to update their authorization occasionally. In an embodiment, the authorization granted by the central authorization server identifies an authorization update deadline: if the application server does not renew its authorization before the authorization update deadline, the central authorization server may deprovision the communication service otherwise provided to the application server. Alternatively, in an embodiment, the application server may itself stop communicating via the edge network when it has received a message denying authorization, and the central authorization server in this case does not deprovision the application server. Between authorization updates, transactions between UEs and the application server may go forwards for a period of time with the authorization message received by the application server from the central authorization server alone providing the authority without requiring a full round trip to the central authorization server to authorize each transaction.

In an embodiment, the periodic event updates provided by application servers engaged in edge computing to the central authorization server are coordinated with an authorization update process. Said in other words, when an application server provides its periodic event update, the central authorization server may evaluate the behavior of that application server, decide whether the application server has operated in compliance with terms and conditions of an agreement between a communication service provider operating the edge network and the application service operating the application server, and grant authorization renewal or updating if the terms and conditions have been complied with. The central authorization server may further evaluate the compliance of the application server with security criteria. Such security criteria may be considered to be part of the terms and conditions. Alternatively, the transaction update process may be conducted asynchronously with the authorization update process. The central authorization server may be said to enforce authorization of edge nodes and/or of application servers engaged in edge computing. It is understood that different application servers may obliged to comply with different terms and conditions, and that the central authorization server would evaluate each different application server in accordance with the specific terms and conditions that apply to that application server.

One of the terms and conditions against which that the central authorization server may evaluate an application server is an extent to which the application server restricts its communication to an edge network associated with the application server. As an example, the terms and conditions may stipulate a percentage of total communication traffic to and from the application server that may occur out of its edge network, for example less than 20 percent or less than 10 percent or less than 5 percent. The volume of communication traffic may be defined as a number of separate messages, a number of separate data packets, a number of bytes, or some other designation of traffic volume. The terms and conditions may stipulate a maximum percent of out of edge network communication because a communication service provider may provide a discounted subscription fee to the application service operating the application server to incentivize the application server to reduce its out-of-edge network communication, thereby reducing the network traffic and latency in the communication service provider's network. If the application server does not in fact satisfy this term of the agreement, the communication service provider may desire to terminate the communication service arrangement or at least to recover additional fees from the application service operating the application server. In an embodiment, the terms and conditions relating to communication traffic volume may specify different traffic rates at different times of the day.

In an embodiment, the terms and conditions may comprise the application server complying with an ad hoc command to temporarily reduce a volume of its out-of-edge network communication or to reduce the volume of its out-of-edge network communication until it receives further notice or a later command. In an embodiment, the terms and conditions may comprise the application server granting access to the central authorization server to audit its store of event information, for example to audit its blockchain storing event records.

One of the terms and conditions may be a restriction on communicating with black-listed IP addresses, for example IP addresses associated with distributing spam (e.g., unsolicited advertisements and/or promotional information), IP addresses associated with cybercrime, IP addresses associated with hackers. The terms and conditions may specify that edge application servers be updated with a newly released black-list within a pre-defined period of time. One of the terms and conditions may be keeping an operating system (OS) or network operating system (NOS) of the application server updated, for example updating the OS of application server with patches that eliminate a security vulnerability that has been identified. One of the terms and conditions may be executing a malware search on the application server periodically. The terms and conditions may comprise executing a malware search on the application server periodically and, if any suspicious artifacts are discovered by the malware search, removing the suspicious artifacts within a predefined period of time after their discovery. The terms and conditions related to restricting IP addresses, compelling updating the OS, and executing malware searches may be abstracted as security criteria. It is understood that the terms and conditions may involve other security criteria not explicitly identified in the examples above.

The central authorization server may analyze at least some of the event information provided by an application server in evaluating the compliance of the application server with terms and conditions and/or with security criteria. In an embodiment, the central authorization server may analyze all the event information received from an application server since its previous authorization. Alternatively, the central authorization server may analyze a percentage of the event information received from the application server since its previous authorization that is less than 100 percent. In an embodiment, the central authorization server may analyze 100 percent, 90 percent, 80 percent, 70 percent, 50 percent, 35 percent, 20 percent, 10 percent, or some other portion of the event information received from the application server.

In an embodiment, the percent of event information analyzed by the central authorization server may be conditioned on a past history of authorization updates for the subject application server. In an embodiment, the central authorization server may determine an authorization score for the application server that represents a degree of compliance with terms and conditions and/or security criteria. If the previous authorization score of the application server is high (where high score reflects a high compliance with terms and conditions and/or with security criteria and low score reflects a low compliance), the central authorization server may analyze relatively less of the received event information (a lower percent of received event information), while if the previous authorization score of the application server is low, but above a minimum authorization threshold, the central authorization server may analyze relatively more of the received event information. In an embodiment, the central authorization server may determine a windowed average of previous compliance scores of an application server and use the windowed average of compliance scores to select a percentage of received event information to evaluate.

The central authorization server may create blocks that contain information about the authorization updates and add it to the blockchain(s). The blocks describing authorization updates may comprise communication path information describing the path the authorization request from the subject application server followed. The block describing the authorization update may comprise information identifying how much event information provided by the application server was analyzed by the central application server. The block describing the authorization updates may comprise an authorization score representing the relative degree of compliance with terms and conditions and/or security criteria of the application server determined by the central authorization server.

In an embodiment, the application servers may provide a hash of a plurality of recent blocks in their edge event blockchain to the central authorization server. For example, when the application server sends in event information to the central authorization server it may determine a hash over blocks added to its edge event blockchain since it last sent event information to the central authorization server and send that hash along with the event information. In an embodiment, the application server may determine a hash over the most recent 100 blocks, the most recent 1,000 blocks, the most recent 10,000 blocks, or some other number of blocks, and send that hash in with event information. As a first level of authorization analysis, the central authorization server may audit the edge event blockchain of the subject application server and compare the hash it calculates to the hash provided with the event information by the application server. If there is a difference between the hash value provided by the application server and the hash calculated by the central authorization server, this discrepancy may result in denial of authorization to the application server or may result in the central authorization server doing a deeper audit of the edge event blockchain of the subject application server.

The edge event blockchains promote the ability for the central authorization server to audit these edge nodes and/or application servers by auditing their edge event blockchains and provides opportunities for more sophisticated analysis of transactions and potentially approvals or confirmation of transactions through maintaining the information about the various endpoints and paths. It provides a way to promote the security of application servers without requiring an authentication trip to the central server for every transaction.

The present disclosure teaches technical solutions to technical problems, specifically the technical problem of reducing communication network traffic and communication latency without compromising communication network security and without unleashing application servers to do whatever they want without centralized monitoring. The teachings describe a framework that is adaptable to different agreements between a communication service provider and different application services, rather than providing an awkward one size fits all compromise solution.

Turning now to FIG. 1, a system 100 is described. In an embodiment, the system 100 comprises a user equipment (UE) 102, a wireless access point (AP) 104, a first edge network 106, and an edge application server 108 that executes an edge application 110. In some contexts, the edge application server 108 may be referred to as an application server. The UE 102 may be provided a wireless communication link by the AP 104, and the AP 104 may communicate via a wired or a wireless communication link to the edge network 106, thereby communicatively coupling the UE 102 to the first edge network 106. The AP 104 may be a WiFi access point or another wireless access point. In an embodiment, other UEs 112 are communicatively coupled to the first edge network 106 via wireless and/or wired communication links. The UEs 112 may comprise any number of UEs. The edge application server 108 is communicatively coupled to the first edge network 106 by a wired or a wireless communication link. Any number of edge application servers 108 may be communicatively coupled to the first edge network 106.

The first edge network 106 is communicatively coupled to a network 124, providing communication coupling of the UEs 102, 112, the AP 104, and the edge application servers 108 to the network 124. In an embodiment, a second edge network 132, a third edge network 134, and a fourth edge network 136 may be communicatively coupled to the network 124. In an embodiment, any number of edge networks may be communicatively coupled to the network 124. It is understood that the combination of the edge networks 106, 132, 134, 136 and the network 124 may be collected into a single abstracted view of a network but are separated in FIG. 1 to assist clear elucidation of the teachings of the present disclosure. The network 124 may comprise one or more public networks, one or more private networks, or a combination thereof.

The edge network 106 comprises communication nodes and/or resources to provide end-to-end communication service between UEs 102, 112 and edge application servers 108. These communication nodes may comprise routers and gateways and other equipment. The edge network 106 comprises communication equipment that is located in a local area, for example within the same communication region. The UEs 102, 112 and edge application servers 108 are located generally within the same local area as the communication equipment making up the edge network 106. The edge networks 132, 134, 136 are similar to the edge network 106 and provide end-to-end communication service between other UEs and other application servers located proximate to the subject edge network. In an embodiment, the geographic size of different edge networks 106, 132, 134, 136 may be different. For example, the geographic size of an edge network located in the sparsely populated Great Plains area of the US may be larger than the geographic size of an edge network located in the densely populated New England area of the US. The edge networks 106, 132, 134, 136 support edge computing (e.g., the computing provided by the edge application 110), whereby application client transactions with edge applications 110 are fulfilled by locally positioned application servers, whereby to reduce communications latency and to reduce traffic in the network 124. The edge applications 110 may comprise gaming applications. The edge applications 110 may comprise Internet search applications. The edge applications 110 may comprise video streaming applications. The edge applications 110 may comprise other kinds of computing and/or data distribution applications. Portions of the edge networks 106, 132, 134, 136 and the network 124 may be implemented in accordance with 5G communication network technology. 5G communication network technology is described further hereinafter with reference to FIG. 4A and FIG. 4B.

A communication service provider may provide communication service via the edge network 106 to the edge application server 108 with the understanding that the edge application server 108 is to operate in compliance with terms and conditions and/or in compliance with security criteria specified in a terms and conditions document, agreement, or rule set. Different edge application servers 108 may be subject to different terms and conditions. In an embodiment, the edge application server 108 may further comprise an edge authorization application 120 and an edge event blockchain 122. The edge authorization application 120 may track edge events associated with operations of the edge application server 108 and store these in blocks that it adds to the edge event blockchain 122. The edge events may be transactions completed with the UE 102, 112. The transactions may be service requests from the UE 102, 112 and service request fulfillments, for example providing computing services provided by the application server. The information about transactions that are stored in blocks may comprise an identity of the UE 102, 112, an identity of the transaction type, a time and date of the transaction, an identity of a path the transaction followed in transiting the edge network 106, and other information. The edge events may be internal events on the edge application server 108, for example records of reboots, records of updates of an operating system (OS) installed on the edge application server 108, records of executions and results of malware detection software, and other internal events. The edge events may be records of handshaking between the edge application server 108 and an edge authorization server 126 to obtain an updated authorization or renewed authorization. In some contexts, the edge authorization server may be referred to as an edge computing authorization platform.

The system 100 further comprises the edge authorization server 126. The edge authorization server 126 executes an authorization application 128 and maintains one or more authorization blockchain 130. In an embodiment, the authorization application 128 maintains a single authorization blockchain 130. In another embodiment, the authorization application 128 maintains a different authorization blockchain 130 for each different edge application server 108. In an embodiment, the authorization application 128 maintains a different authorization blockchain 130 for each different edge network 106, 132, 134, 136 (e.g., blocks from a plurality of different edge application servers 108 involved in edge computing in the same edge network are stored on the same authorization blockchain 130).

The authorization application 128 may receive occasional updates of edge events from edge authorization applications 120 executing on edge application servers 108. The authorization application 128 may store the information about edge events received from the edge authorization applications 120 in a block and add it to the authorization blockchain 130 (e.g., in a single blockchain 130 storing information from all the different edge authorization applications 120 on all the different application servers 108 or in the authorization blockchain 130 associated with the specific edge network in which the subject edge application server 108 executes or in the specific authorization blockchain 130 associated with the subject edge application server 108 in the case that the authorization application 128 maintains a separate authorization blockchain 130 for each edge application server 108). In an embodiment, the authorization application 128 creates a block when it conducts an authorization update of an edge application server 108 and adds this block to the appropriate authorization blockchain 130. The block associated with an authorization update comprises information about the update process such as the identity of the edge application server 108, the time and date of the authorization process, an optional authorization score, an optional percent of event information associated with the edge application server 108 analyzed during the update process, and information about a path of communications between the edge authorization server 126 and the edge application server 108 during the update process. The information about the communication path may identify communication nodes involved in the update process, for example IP addresses of nodes transited by the update process communication messages.

If the authorization application 128 finds that an edge application server 108 and/or an edge authorization application 120 has complied sufficiently with terms and conditions and/or with security criteria applicable to the subject edge application server 108, the authorization application sends an authorization update message to the edge authorization application 120. The authorization update message may identify a time-to-live of the authorization update message or an expiration date of the authorization. If the authorization application 128 finds that an edge application server 108 and/or an edge authorization application 120 has not complied sufficiently with terms and conditions and/or with security criteria applicable to the subject edge application server 108, the authorization application 128 may take action. Taking action may comprise sending a notification or warning identifying the server's violation of terms and conditions and/or violation of security criteria to a stakeholder, for example to an application service provider or to an enterprise that owns the subject edge application server 108 that executes the authorization application 128. Taking action may comprise altering communication network service provided to the subject edge application server that does not comply with terms of use and/or with security criteria. Taking action may comprise deprovisioning or disabling communication service in the edge network 106, 132, 134, 136 for the edge application server 108. This may result in the edge application server 108 not being able to communicate with any network. Taking action may comprise changing a quality of service (QoS) or service level agreement (SLA) with which communications traffic associated with the subject edge application server 108 is treated by network nodes in the edge network 106, 132, 134, 136 to which the subject edge application server 108 is communicatively coupled. For example, a data throughput rate and/or bandwidth previously provided to the subject edge application server 108 may be reduced. Taking action may comprise charging an extra communication service fee to an application service that owns or manages the edge application server 108.

Figure 2A:
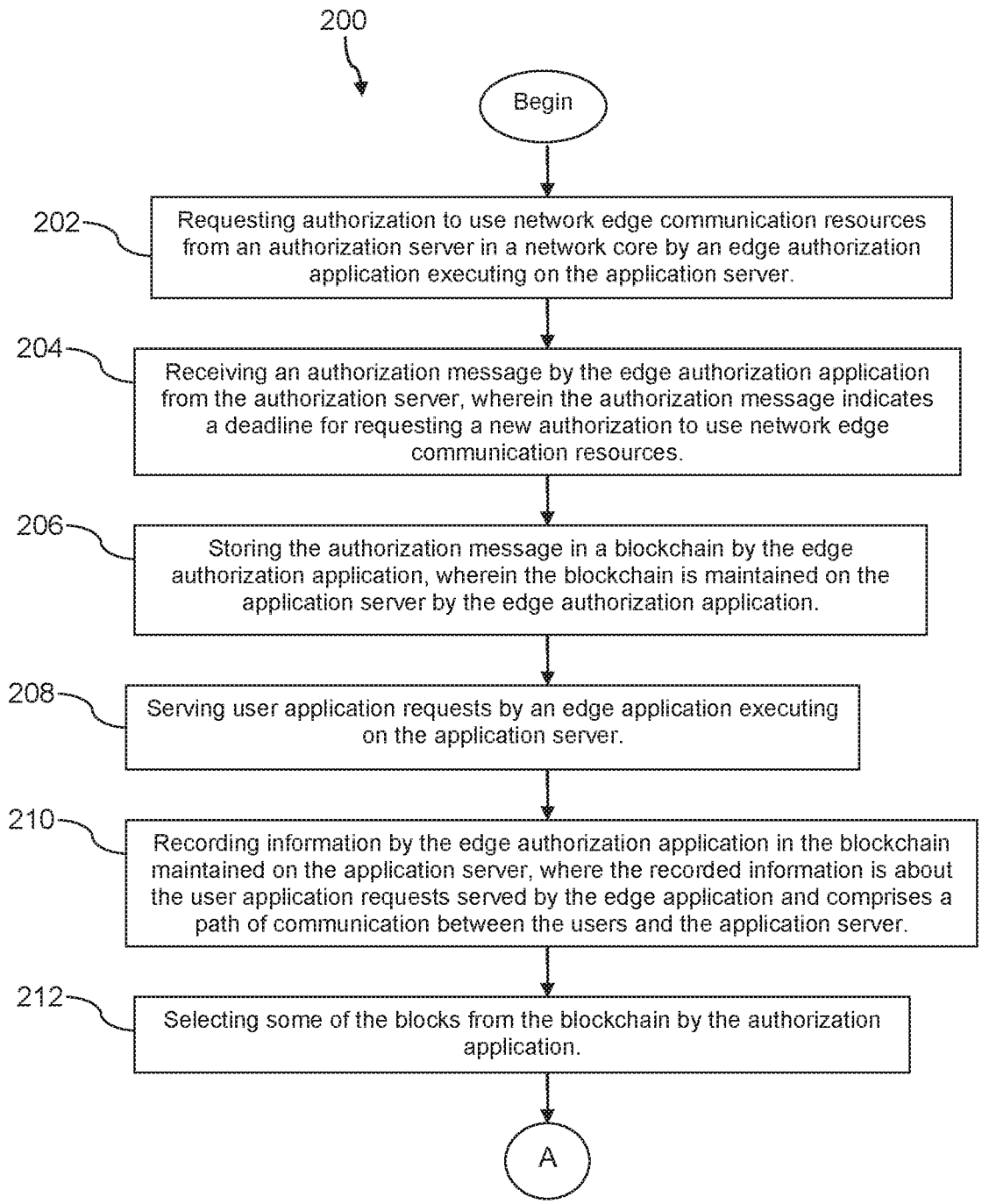
FIG. 2A and FIG. 2B is a flowchart of a method according to an embodiment of the disclosure.
Figure 2B:
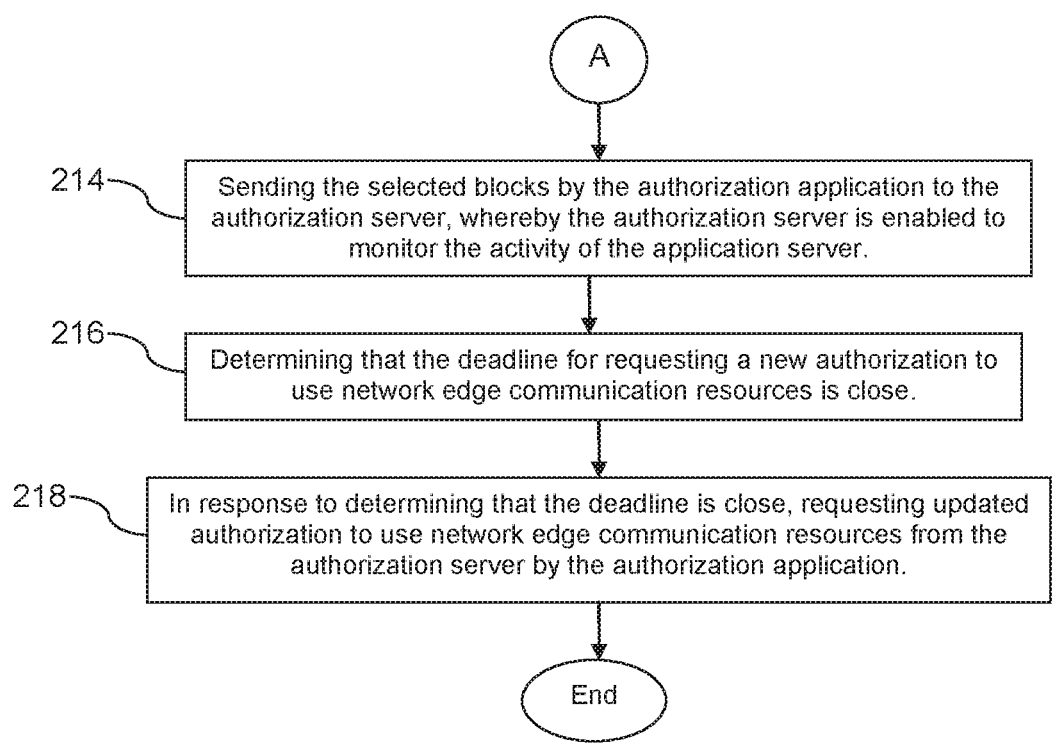

Turning now to FIG. 2A and FIG. 2B, a method 200 is described. In an embodiment, the method 200 is a method of providing computing services at the edge of a communication network by an application server. At block 202, the method 200 comprises requesting authorization to use network edge communication resources from an authorization server in a network core by an edge authorization application executing on the application server. At block 204, the method 200 comprises receiving an authorization message by the edge authorization application from the authorization server, wherein the authorization message indicates a deadline for requesting a new authorization to use network edge communication resources.

At block 206, the method 200 comprises storing the authorization message in a blockchain by the edge authorization application, wherein the blockchain is maintained on the application server by the edge authorization application. At block 208, the method 200 comprises serving user application requests by an edge application executing on the application server. At block 210, the method 200 comprises recording information by the edge authorization application in the blockchain maintained on the application server, where the recorded information is about the user application requests served by the edge application and comprises a path of communication between the users and the application server.

At block 212, the method 200 comprises selecting some of the blocks from the blockchain by the authorization application. At block 214, the method 200 comprises sending the selected blocks by the authorization application to the authorization server, whereby the authorization server is enabled to monitor the activity of the application server.

At block 216, the method 200 comprises determining that the deadline for requesting a new authorization to use network edge communication resources is close. At block 218, the method 200 comprises, in response to determining that the deadline is close, requesting updated authorization to use network edge communication resources from the authorization server by the authorization application.

Figure 3:
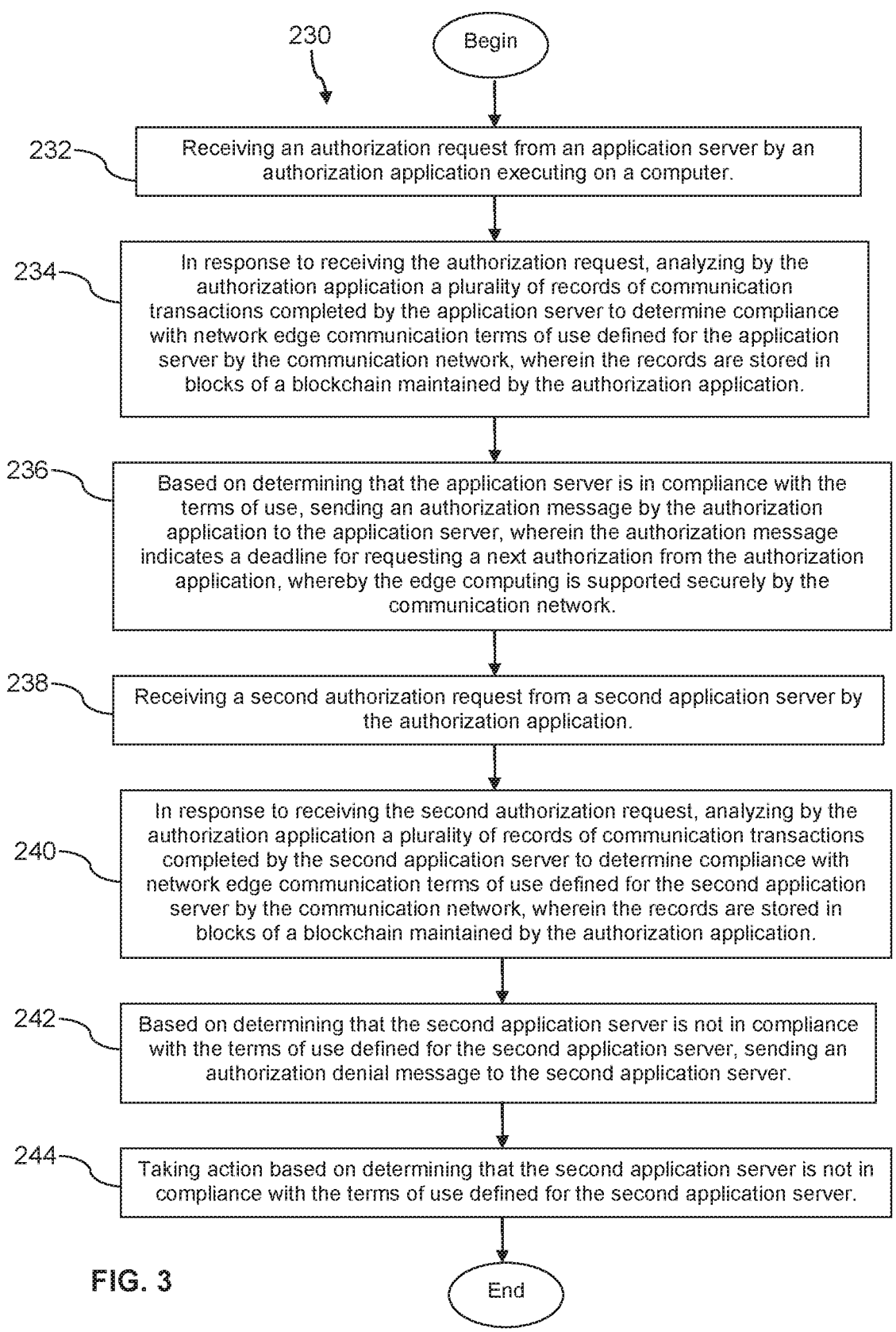
FIG. 3 is a flow chart of another method according to an embodiment of the disclosure.

Turning now to FIG. 3, a method 230 is described. In an embodiment, the method 230 comprises a method of authorizing computing services at the edge of a communication network. At block 232, the method 230 comprises receiving an authorization request from an application server by an authorization application executing on a computer. At block 234, the method 230 comprises in response to receiving the authorization request, analyzing by the authorization application a plurality of records of communication transactions completed by the application server to determine compliance with network edge communication terms of use defined for the application server by the communication network, wherein the records are stored in blocks of a blockchain maintained by the authorization application. At block 236, the method 230 comprises, based on determining that the application server is in compliance with the terms of use, sending an authorization message by the authorization application to the application server, wherein the authorization message indicates a deadline for requesting a next authorization from the authorization application, whereby the edge computing is supported securely by the communication network.

At block 238, the method 230 comprises receiving a second authorization request from a second application server by the authorization application. At block 240, the method 230 comprises, in response to receiving the second authorization request, analyzing by the authorization application a plurality of records of communication transactions completed by the second application server to determine compliance with network edge communication terms of use defined for the second application server by the communication network, wherein the records are stored in blocks of a blockchain maintained by the authorization application.

At block 242, the method 230 comprises, based on determining that the second application server is not in compliance with the terms of use defined for the second application server, sending an authorization denial message to the second application server. At block 244, the method comprises taking action based on determining that the second application server is not in compliance with the terms of use defined for the second application server. In an embodiment, taking action comprises deprovisioning communication service by the authorization application for the second application server. In an embodiment, taking action comprises adding an additional fee to a customary service fee associated with the second application server. In an embodiment, taking action comprises reducing a quality of service (QoS) provided to the second application server. The QoS provided to the second application server may be reduced by changing a provisioning configuration in a network data store, for example changing provisioning of a QoS associated with the second application server in one or more gateways or routers or other communication network nodes.

Figure 4A:
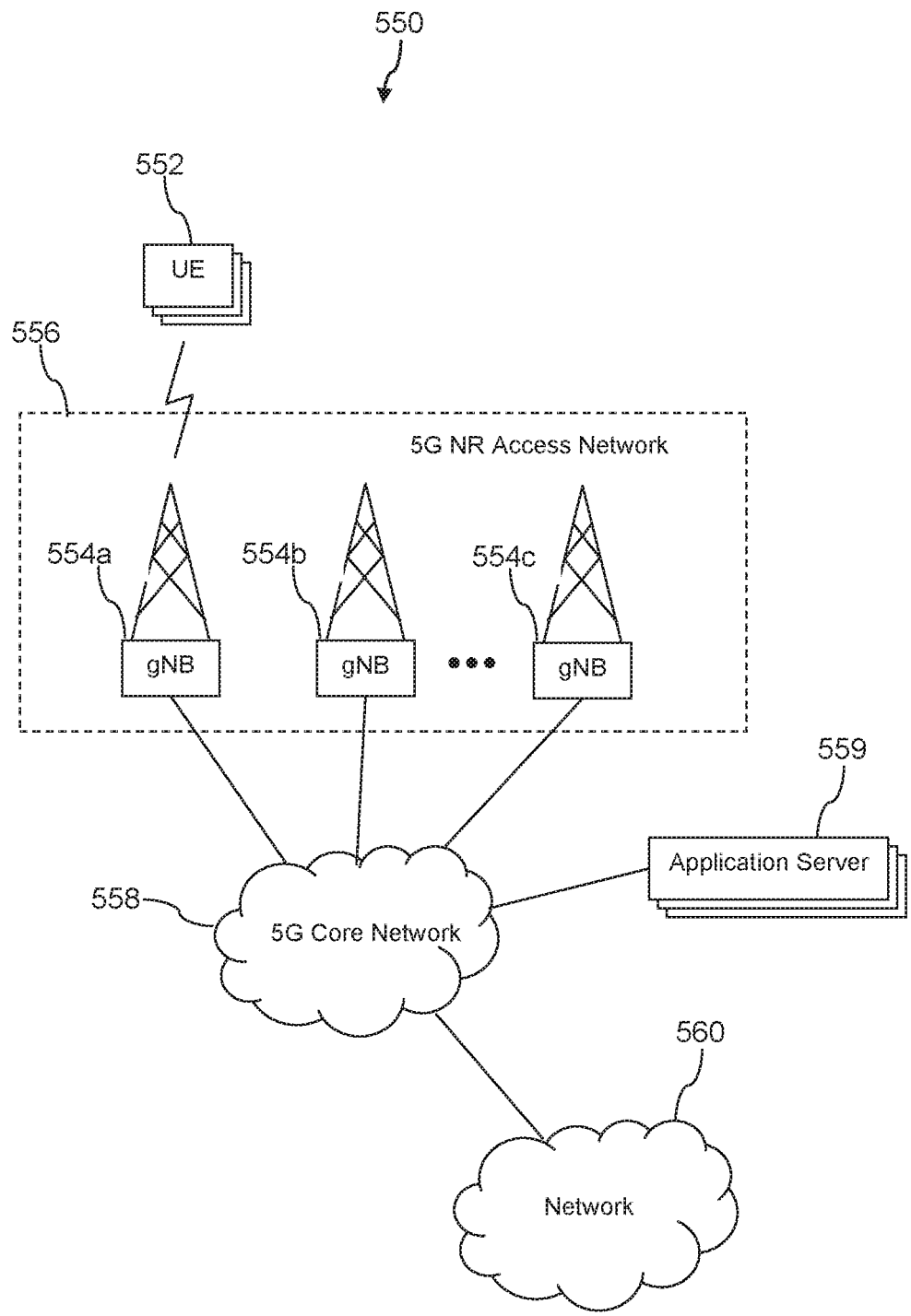
FIG. 4A is a block diagram of a communication network according to an embodiment of the disclosure.

Turning now to FIG. 4A, an exemplary communication system 550 is described. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a gigabit Node B (gNB). In 4G technology (e.g., long term evolution (LTE) technology) an access node 554 may be referred to as an enhanced Node B (eNB). In 3G technology (e.g., code division multiple access (CDMA) and global system for mobile communication (GSM)) an access node 554 may be referred to as a base transceiver station (BTS) combined with a basic station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 4B:
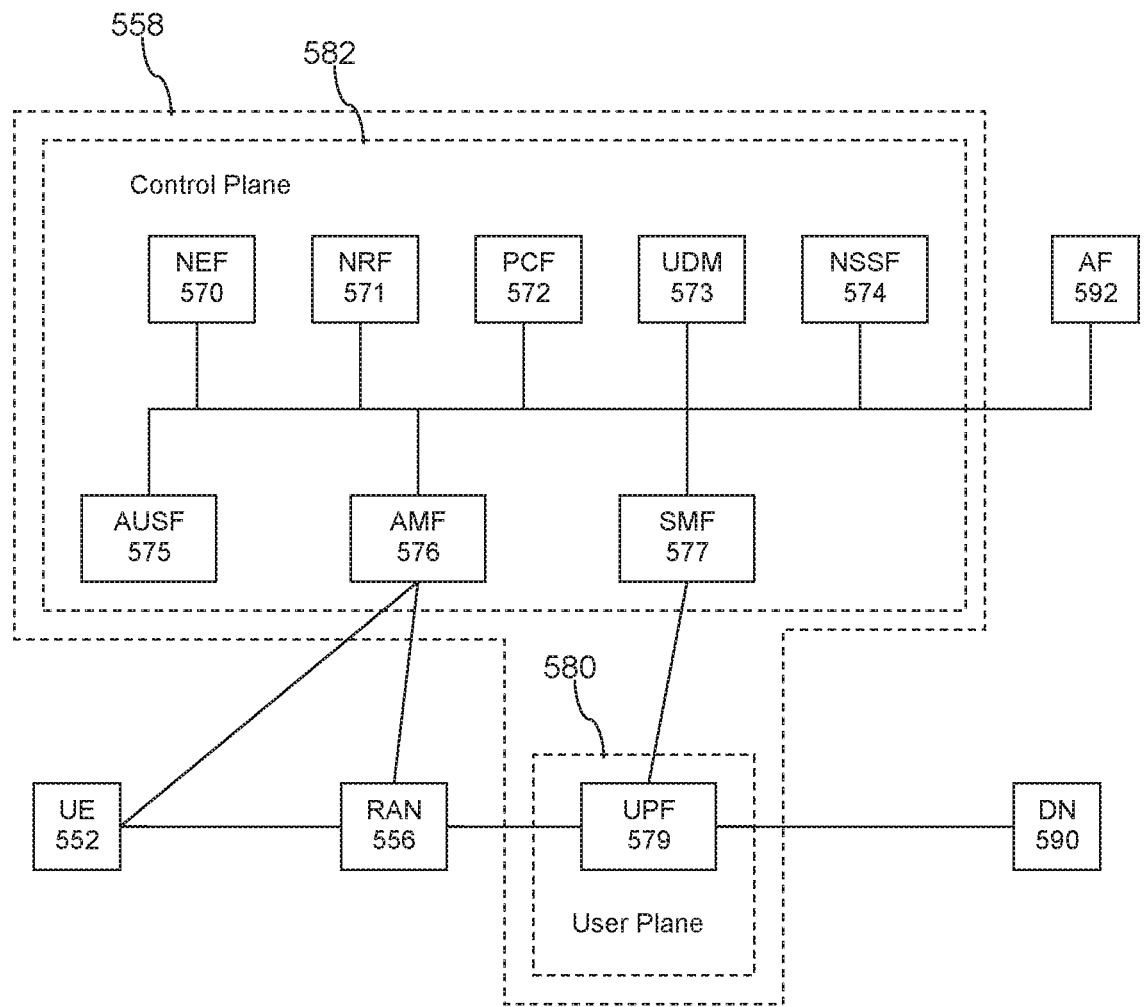
FIG. 4B is a block diagram of a 5G core network according to an embodiment of the disclosure.

Turning now to FIG. 4B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access node 556, to a data network 590 (e.g., the network 560 illustrated in FIG. 4A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 5:
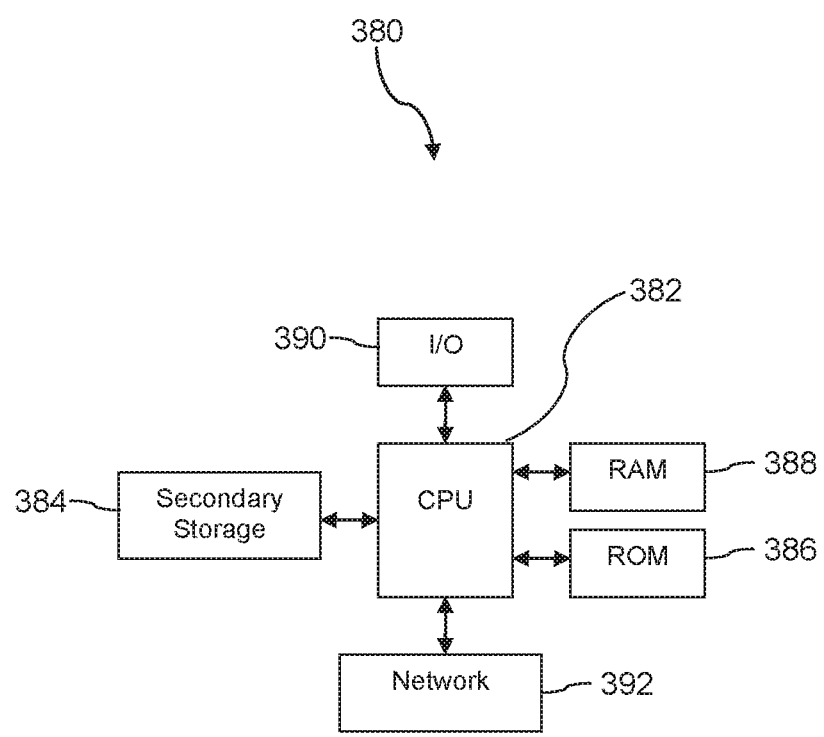
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of providing computing services at the edge of a communication network by an application server, comprising:
   requesting authorization to use network edge communication resources from an authorization server in a network core by an edge authorization application executing on the application server;
   receiving an authorization message by the edge authorization application from the authorization server, wherein the authorization message indicates a deadline for requesting a new authorization to use network edge communication resources;
   storing the authorization message in a blockchain by the edge authorization application, wherein the blockchain is maintained on the application server by the edge authorization application;
   serving user application requests by an edge application executing on the application server;
   recording information by the edge authorization application in the blockchain maintained on the application server, where the recorded information is about the user application requests served by the edge application and comprises a path of communication between the users and the application server;
   selecting at least some of the recorded information from the blockchain by the authorization application since a last periodic update;
   sending the selected recorded information from the blockchain by the authorization application to the authorization server, whereby the authorization server is enabled to monitor the activity of the application server;
   determining that the deadline for requesting a new authorization to use network edge communication resources is close; and
   in response to determining that the deadline is close, requesting updated authorization to use network edge communication resources from the authorization server by the authorization application.

2. The method of claim 1, further comprising the edge authorization application storing information about an operating system upgrade on the application server in the blockchain.

3. The method of claim 1, further comprising the edge authorization application storing information about executing a malware search software on the application server.

4. The method of claim 1, further comprising the edge authorization application storing information about applying a black-list on the application server to block communication with IP addresses listed in the black-list, whereby to interdict spam traffic on the communication network.

5. The method of claim 1, further comprising receiving service requests by an edge computing application executing on the application server and fulfilling service requests by the edge computing application.

6. The method of claim 5, wherein the service requests comprise requests for Internet searches.

7. The method of claim 5, wherein the service requests comprise requests for gaming transactions.

8. The method of claim 5, wherein the service requests comprise requests for streaming video content.

9. An edge computing authorization platform, comprising:
   a processor;
   a non-transitory memory storing at least one blockchain comprising blocks recording authorization events, wherein each authorization event identifies an edge application server that has been authorized to use communication network services and identifies a deadline for requesting a new authorization; and
   an authorization application stored in the non-transitory memory that, when executed by the processor:
      receives a plurality of transaction reports from a plurality of edge application servers, wherein each transaction report is stored in a blockchain on one of the plurality of edge application servers and comprises information about at least one transaction between the associated edge application server and a user equipment (UE) and information about a path followed by the transaction through the communication network,
      receives a plurality of authorization requests from the plurality of edge application servers to use network edge communication resources,
      in response to receiving an authorization request from an edge application server, analyzes at least one transaction report received from the edge application server and at least one block recording authorization events associated with the edge application server stored in the blockchain in the non-transitory memory to determine if the edge application server complies with terms of use defined for the edge application server by the communication network,
      in response to determining that an edge application server complies with terms of use,
         creates a block recording an authorization event identifying the edge application server that complies with terms of use and a deadline for requesting a new authorization and storing the block in the blockchain in the non-transitory memory, and
         sends an authorization message to the edge application server that complies with the terms of use, wherein the authorization message indicates the deadline for requesting the new authorization to use network edge communication resources,
      subsequently receives the new authorization request to use network edge communication resources from the edge application server that complies with terms of use prior to the deadline, and
      in response to determining that an edge application server does not comply with terms of use, takes action by altering communication network service provided to the edge application server that does not comply with terms of use.

10. The edge computing authorization platform of claim 9, wherein the authorization application alters communication network service provided to the edge application server that does not comply with terms of use by causing the edge application server that does not comply with terms of use from receiving communication network services to be deprovisioned for communication service.

11. The edge computing authorization platform of claim 9, wherein the authorization application alters communication network service provided to the edge application server that does not comply with terms of use by causing the communication quality of service (QoS) delivered to the edge application server that does not comply with terms of use to be reduced.

12. The edge computing authorization platform of claim 9, wherein the authorization application alters communication network service provided to the edge application server that does not comply with terms of use by causing an extra communication service fee to be added to an application service that manages the edge application server that does not comply with terms of use.

13. The edge computing authorization platform of claim 9, wherein some of the edge application servers are gaming application servers.

14. The edge computing authorization platform of claim 9, wherein some of the edge application servers are streaming video application servers.

15. The edge computing authorization platform of claim 9, wherein the authorization application further determines if the edge application server complies with terms of use defined for the edge application server by evaluating a compliance with terms restricting communication with black-listed IP addresses, evaluating a compliance with terms stipulating keeping an operating system of the edge application server updated, or evaluating a compliance with terms stipulating periodically executing a malware search on the edge application server.

16. A method of authorizing computing services at the edge of a communication network, comprising:

receiving a plurality of transaction reports from an edge application server by an authorization application executing on a computer, wherein each transaction report is stored in a blockchain on the edge application server and comprises information about at least one transaction between the edge application server and a user equipment (UE) and information about a path followed by the transaction through the communication network;

maintaining a blockchain by the authorization application that stores the information from the plurality of transaction reports;

receiving an authorization request to use network edge communication resources from the edge application server by the authorization application;

in response to receiving the authorization request, analyzing by the authorization application the information stored in the blockchain maintained by the authorization application about communication transactions completed by the edge application server to determine compliance with network edge communication terms of use defined for the edge application server by the communication network;

based on determining that the edge application server is in compliance with the terms of use, sending an authorization message by the authorization application to the application server, wherein the authorization message indicates a deadline for requesting a next authorization from the authorization application, whereby the edge computing is supported securely by the communication network; and subsequently receiving a new authorization request to use network edge communication resources from the edge application server prior to the deadline.

17. The method of claim 16, further comprising:

receiving a second authorization request from a second application server by the authorization application;

in response to receiving the second authorization request, analyzing by the authorization application a plurality of records of communication transactions completed by the second application server to determine compliance with network edge communication terms of use defined for the second application server by the communication network, wherein the records are stored in blocks of a blockchain maintained by the authorization application;

based on determining that the second application server is not in compliance with the terms of use defined for the second application server, sending an authorization denial message to the second application server; and taking action based on determining that the second application server is not in compliance with the terms of use defined for the second application server.

18. The method of claim 17, wherein taking action comprises de provisioning communication service by the authorization application for the second application server.

19. The method of claim 17, wherein taking action comprises reducing a quality of service provided to the second application server.

20. The method of claim 17, wherein taking action comprises adding an additional fee to a subscription service fee associated with the second application server.

* * * * *